Sept. 7, 1926.

N. A. NEWDICK

CLUTCH

Filed May 22, 1922

1,599,343

Witness
E. A. Becker.

Inventor
Norton A. Newdick
By H. S. McDowell
Attorney

Patented Sept. 7, 1926.

1,599,343

UNITED STATES PATENT OFFICE.

NORTON A. NEWDICK, OF COLUMBUS, OHIO, ASSIGNOR TO THE COLODER COMPANY, OF COLUMBUS, OHIO, A CORPORATION OF DELAWARE.

CLUTCH.

Application filed May 22, 1922. Serial No. 562,802.

This invention relates to clutches and is particularly directed to an improved friction clutch of the type embodying independently rotatable driving and driven members which are adapted to be coupled for unitary rotation by a plurality of friction disks, which upon being brought into and out of frictional co-operation with one another are adapted to control the locked and relative rotation of said members.

The invention consists in the provision of a clutch of the above type wherein an improved structure is provided for applying or removing pressure to or from the disk assembly of the clutch, by means of which the operation of the clutch is rendered positive and effective, of long life and extremely convenient and susceptible to manual control.

It further consists in providing a clutch of the above character with a pressure plate at one end of the disk assembly, which is shiftable axially of the clutch to apply pressure to or remove the same from said disks, the said plate being rotatably connected with one of said members upon which latter is also mounted a support head arranged to carry a plurality of pivotal crank elements, operated from a common hub and formed so that upon oscillation of said elements certain of the arms thereof will be forced into frictional engagement with said plate to control the pressure which the latter exercises upon the disk assembly, the said pressure plate, supporting head and crank elements being mounted upon a common member so as to rotate unitarily and to overcome wear occasioned by friction therebetween.

With these and other objects in view, as will appear as the description proceeds, the invention consists in the novel features of construction, combinations of elements and arrangements of parts, hereinafter to be fully described and pointed out in the appended claims.

In the accompanying drawing—

Figure 1:
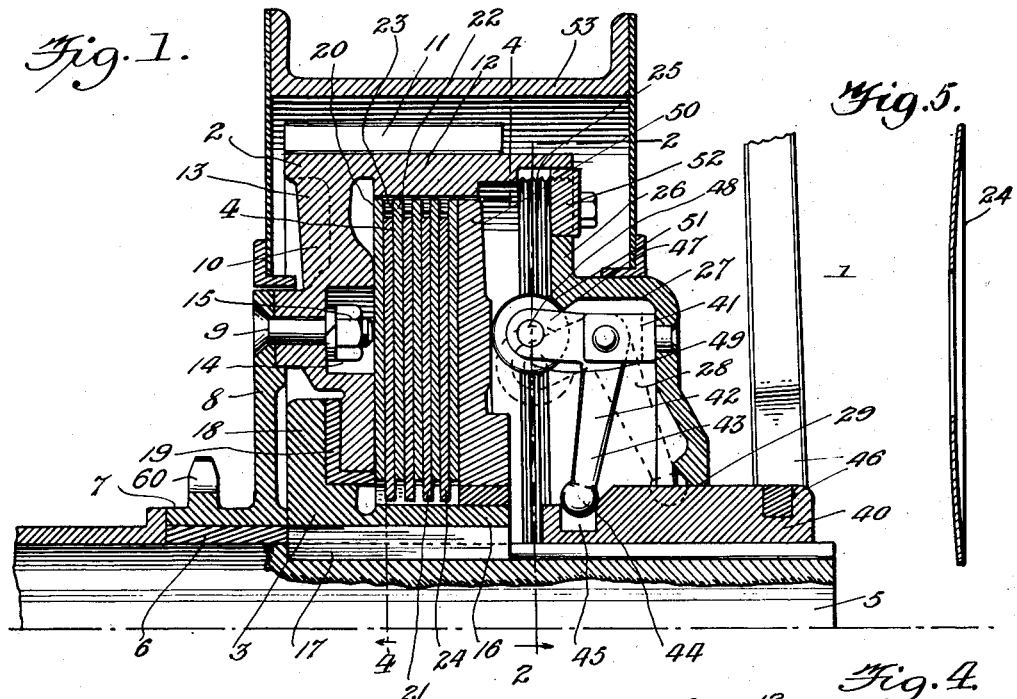
Fig. 1 is a vertical sectional view taken through the improved clutch comprising the present invention.
Figure 5:
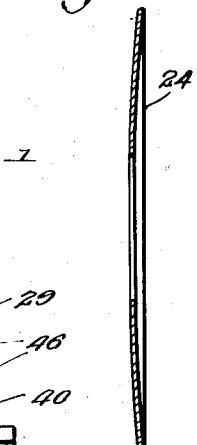
Fig. 5 is a sectional view of one of the discs 24 illustrating in a somewhat exaggerated manner, the camber thereof.
Figure 2:
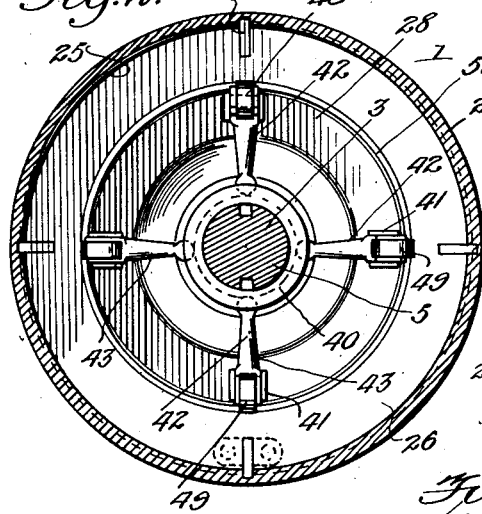
Fig. 2 is a vertical sectional view on a reduced scale taken on the plane disclosed by the line 2—2 of Figure 1.
Figure 4:
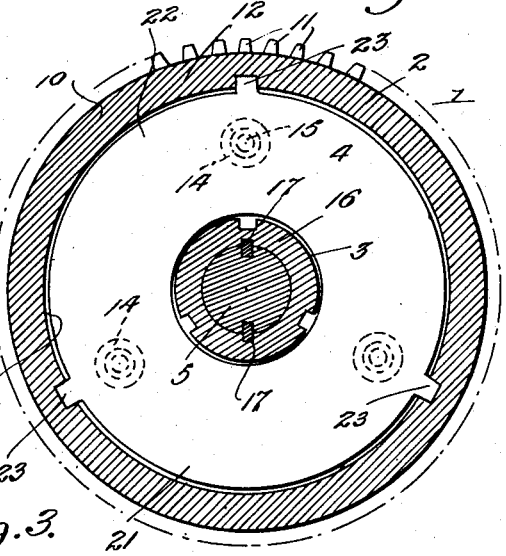
Fig. 4 is a detailed vertical sectional view on a reduced scale taken in the line 4—4 of Figure 1, the casing of the clutch being omitted.
Figure 3:
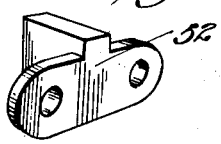
Fig. 3 is a detailed view of the locking key structure for maintaining the adjustments of the supporting head.

Referring more particularly to the details of the invention, the numeral 1 designates my improved clutch in its entirety. The clutch consists broadly of a driving member 2, an axially disposed driven member 3, and a frictional disk assembly 4 between said members, by means of which the rotation of the driven member is controlled. The driven member includes an axial support or shaft 5 upon which is mounted a bushing 6 around which rotates the sleeve or hub 7 of the driving member 2. The sleeve 7 includes a perpendicularly extending circular wall or flange 8 to which is bolted or otherwise secured, as at 9, the outer section 10 of the driving member. This outer section, in this instance, includes gear teeth 11, admitting of the application of power to the driving member, although the use of gear teeth is not absolutely necessary in effecting this result. The gear teeth 11 of the outer section are formed upon an annular ring 12, with which is integrally connected an inwardly extending wall or web 13, disposed at one end of the ring 12, and suitably counter sunk at intervals to provide pockets 14 for the reception of the nuts 15 of the bolts 9, which are utilized in securing together the inner and outer sections of the driving member.

The driven member includes a sleeve or hub 16, which is preferably keyed as at 17 to rotate with the shaft 5, and the inner end of said sleeve is provided with a collar 18, which provides a seat for a ring shaped bushing 19, the latter being interposed between the collar 18 and the inner periphery of the wall 13 and provides means for maintaining the concentricity of the driving and driven members, produces a substantial construction between said members and admits of their relative rotation without being accompanied by destructive wear.

Formed between the hub of the driven member and the outer flange of the driving member and the wall 13 is a disk compartment 20, in which is disposed the disk assembly 4. Arranged to be positioned within the compartment 20 is a plurality of substantially flat alternately arranged steel and brass disks 21 which are disposed in sets. The set of disks 22 possessing the largest diameter is keyed as at 23 to the driving member and rotate loosely about the driven member, while the set of disks 24, possessing the smallest diameter, is keyed to the driven member 3 and mounted independently of positive connection with the driving member. These disks originally are given a slight camber so that when forced together a secure frictional grip will be exercised therebetween, which will enable the driven member under predetermined load conditions to rotate in unison with the driving member. However, upon the placing of an overload upon the driven member, or the mechanism associated therewith, relative movement between said disks will obtain, thereby allowing the driving member to rotate independently of said driven member to avoid damage to mechanism co-operatively related with the clutch.

The invention consists primarily in the provision of a novel structure by means of which the relative pressure between the disks is capable of being readily controlled by manually operated means, in order that the clutch may be employed in the dual capacity of a cut-off and overload clutch. This is accomplished by providing the ring 12 of the driving member with internal threads 25, which are situated at the outer end of the disk compartment 20. Arranged to be engaged with the threads 25 are the threads of an adjustable pressure head 26, which is capable of being moved longitudinally of the shaft 5 and maintained in its various set positions of adjustment. The inner surface of the head 26 is depressed as at 27 to produce an annular pocket 28 and the axial portion of the head 26 is formed with an opening 29 through which slidably projects an operating hub 40, loosely mounted upon the shaft 5. Carried by the head 26 within the pocket 28 is a plurality of fixed brackets 41 upon which are pivotally mounted bell-crank levers 42. These levers have their longer arms 43 terminated in spherical ends 44 which are disposed within an annular groove 45 provided in the slidable hub 40, which latter is adapted to be manually reciprocated by an extraneously located yoke 46, whereby the bell-crank levers are capable of being operated in unison. The shorter arms 47 of said levers are in this instance provided with transversely extending pins 48, upon which are mounted for rotation rollers 49, adapted to be maintained in or out of engagement with a sliding pressure plate 50, loosely mounted upon the driven member and keyed to the driving member. It will be manifest that by this construction, when the hub 40 is moved inwardly by the operation of the manually controlled yoke 46, the outer arms 47 of the bell-crank levers will be rocked outwardly, until the rollers 49 are forced into contact with an annular shoulder 51 provided upon the head 26, in which position the axes of the pins 48 will be off center with respect to the axes of the levers 42, and by reason of the pressure which the disk assembly exercises upon said rollers, the latter will be securely maintained in engagement with the shoulder 51, thereby maintaining the disks in firm frictional relationship and securing the necessary driving relation between the members 2 and 3. A bushing may be inserted, as shown in Figure 1, between the complemental portions of the pressure plate 20 and the hub 16, this bushing being preferably of bronze in order to reduce friction and prevent undue wear between these relatively movable parts.

It will be noted that the pressure plate 50, the head 26, the levers 42 and the driving member 2 rotate unitarily, and since there is an absence of undue relative movement between these parts little wear will result in the clutch, and this wear will be mainly received by the disks 21. To compensate for such wear, the head 26 is threaded as at 25 into the ring 12 of the driving member. It will be apparent by rotating said head, the effects of wear may be quickly and readily taken up. Locking keys 52 are provided in conjunction with the head 26 and the ring 12 to maintain said head in its various set positions of adjustment. A housing or casing 53 may be employed to surround the driving member to protect and encase the mechanism of the clutch. The sleeve or hub 7 of the driving member 2 may be provided, as shown in Figure 1, with a sprocket 60 from which motion may be derived from the driving member independently of the operation of the clutch as a whole, said sprocket element 60 being so situated as to rotate in unison with the driving member.

What is claimed is:

1. In a clutch, concentrically arranged driving and driven members, longitudinally separable frictional clutch disks alternately keyed to said driving and driven members, means for controlling the frictional driving relationship between said disks, consisting of an axially movable pressure plate fixed to rotate with one of said members and movable into and out of frictional engagement with said disks, a supporting head mounted upon the member with which said pressure plate rotates, pivoted lever elements carried by said head and cooperative with said plate to maintain frictional engagement between said disks when said lever elements assume pressure applying positions, stop means provided in conjunction with said supporting head for definitely limiting the pressure applying movement of said lever elements, and a common actuating means for said lever elements.

2. In a clutch, concentrically arranged driving and driven members, longitudinally separable frictional clutch disks alternately keyed to said members, said disks being of dished formation so that the disk assembly is rendered longitudinally resilient, a supporting head rotatable with one of said members, a plurality of bell crank levers pivotally mounted upon said head and adapted upon oscillation to compress said disk assembly, means for limiting the degree of oscillation of said levers, said means being situated so that the normal resiliency of said disk assembly serves to maintain said levers against said means, and a common actuating device for said levers.

In testimony whereof, I have signed my name to this specification.

NORTON A. NEWDICK.